(12) United States Patent
Klemic

(10) Patent No.: US 6,869,464 B2
(45) Date of Patent: Mar. 22, 2005

(54) ATMOSPHERIC WATER ABSORPTION AND RETRIEVAL DEVICE

(76) Inventor: John Klemic, 18888 Lancashire Rd., Detroit, MI (US) 48223

( * ) Notice: Subject to any disclaimer, the term of this patent is extended or adjusted under 35 U.S.C. 154(b) by 0 days.

(21) Appl. No.: 10/360,070

(22) Filed: Feb. 6, 2003

(65) Prior Publication Data

US 2003/0145729 A1 Aug. 7, 2003

Related U.S. Application Data

(60) Provisional application No. 60/354,816, filed on Feb. 6, 2002.

(51) Int. Cl.$^7$ .......................... B01D 53/04; B01D 53/28
(52) U.S. Cl. ............................ 95/117; 95/121; 96/122; 96/147; 96/154
(58) Field of Search .......................... 95/117, 121–126; 96/108, 119, 130, 134–143, 147, 154

(56) References Cited

U.S. PATENT DOCUMENTS

| | | | | |
|---|---|---|---|---|
| 894,973 | A | * 8/1908 | Morgan | 96/119 |
| 1,866,207 | A | * 7/1932 | Hansen | 96/119 |
| 2,033,665 | A | * 3/1936 | Young | 96/119 |
| 2,036,909 | A | * 4/1936 | Baker | 96/119 |
| 2,138,687 | A | * 11/1938 | Altenkirch | 62/92 |
| 2,222,828 | A | * 11/1940 | Guthrie | 96/122 |
| 2,306,674 | A | * 12/1942 | Keene et al. | 96/119 |
| 4,124,116 | A | * 11/1978 | McCabe, Jr. | 96/108 |
| 4,146,372 | A | * 3/1979 | Groth et al. | 95/124 |
| 4,285,702 | A | * 8/1981 | Michel et al. | 95/124 |
| 4,299,599 | A | * 11/1981 | Takeyama et al. | 96/122 |
| 4,342,569 | A | * 8/1982 | Hussmann | 95/124 |
| 4,380,458 | A | * 4/1983 | Callihan | 95/126 |
| 4,726,817 | A | * 2/1988 | Roger | 95/115 |
| 4,983,389 | A | 1/1991 | Levy | 424/404 |
| 4,983,390 | A | 1/1991 | Levy | 424/404 |
| 5,035,805 | A | * 7/1991 | Freeman et al. | 210/689 |

(List continued on next page.)

FOREIGN PATENT DOCUMENTS

| | | | |
|---|---|---|---|
| EP | 0045516 A1 | * 2/1982 | |
| EP | 0212029 A1 | * 3/1987 | |
| EP | 0517021 A1 | * 12/1992 | |
| WO | WO 96/25959 | 8/1996 | ........... A61L/15/60 |

OTHER PUBLICATIONS

"Mineral Composition and PH of Dairy Waste", RM Jones and MA Sanderson, Texas Agric. Exp. Stn. CPR–5258. pp. 72–75. Forage Research in Texas, 1996.

(List continued on next page.)

*Primary Examiner*—Robert H. Spitzer
(74) *Attorney, Agent, or Firm*—Gifford, Krass, Groh, Sprinkle, Anderson & Citkowski, P.C.

(57) ABSTRACT

A device for absorbing atmospheric moisture includes a support member with a net extending therefrom. The net includes a super absorbent polymer that has the property of being able to absorb a multiple of the polymer mass in atmospheric water and to thereafter release the water in response to an external stimulus. The device is in this way reusable. The device has particular application in the clearing of fog, manure odor clearance, and collection of potable water in remote locations. A process for extracting atmospheric moisture is also detailed that includes the step of extending a super absorbent polymer net into contact with an atmosphere. Thereafter, with that being in contact with the atmosphere for a sufficient amount of time moisture is absorbed from the atmosphere. The application of a stimulus to the super absorbent polymer containing atmospheric moisture causes the release of liquid water therefrom. The super absorbent polymer is then suitable for reuse to again absorb atmospheric water.

11 Claims, 3 Drawing Sheets

U.S. PATENT DOCUMENTS

| | | | | |
|---|---|---|---|---|
| 5,215,561 A | * | 6/1993 | Cameron | 96/119 |
| 5,846,296 A | * | 12/1998 | Krumsvik | 95/115 |
| 6,051,317 A | | 4/2000 | Brueggemann et al. | 428/378 |
| 6,270,873 B1 | | 8/2001 | Darnett | 428/76 |
| 6,280,504 B1 | * | 8/2001 | McMahon | 95/116 |
| 6,364,937 B1 | * | 4/2002 | McMahon | 95/118 |
| 6,423,122 B1 | * | 7/2002 | Kelders | 96/119 |
| 6,511,525 B2 | * | 1/2003 | Spletzer et al. | 95/41 |

OTHER PUBLICATIONS

"Polymer Improvements Help Build a Better Baby Diaper", US Dept. of Energy, Office of Science.

"Hotwiring Biosensors" James Klemic, Eric Stern, and Mark Reed, Nature biotechnology, vol. 19, pp. 924–925; Oct. 2001.

* cited by examiner

ATMOSPHERIC WATER ABSORPTION AND RETRIEVAL DEVICE

RELATED APPLICATIONS

This application claims priority of U.S. Provisional Patent Application No. 60/354,816 filed Feb. 6, 2002, which is incorporated herein by reference.

FIELD OF THE INVENTION

The present invention relates to devices for collecting atmospheric water with a super absorbent polymer and, more particularly, to devices with particular applications in dehumidification, fog dispersal, water retrieval, pollution control, and military applications.

BACKGROUND OF THE INVENTION

Atmospheric moisture represents a peril and a resource. Fog represents a navigation hazard, and dehumidification of living space represents a considerable energy consumption component of air conditioning. Yet, in arid conditions, dew condensation represents one of the few reliable water resources. Additionally, in rural areas where arsenic and other undesirable minerals occur in well water, or in other areas where potable water is not readily available, humidity represents a clean and sustainable water supply.

While the prior art details numerous processes for removing atmospheric moisture, all of these processes suffer one or more limitations that preclude widespread feasibility. Cooling of air is a well known method to reduce the dew point and thereby condense atmospheric moisture, yet equipment and energy intensive. Alternatively, passive dew condensing traps are labor intensive to prepare and are inefficient in collecting condensate. Thus there exists a need for a device able to absorb large quantities of atmospheric moisture and to release the resulting water in a strong response to external stimuli.

Agriculture operations, particularly cattle, hog, and poultry feeding operations, produce large amounts of manure that, when processed by means of lagoons, present social and health concerns. Similar situations occur and exist in canning, manufacturing, and other industries. There is a need for a device that can be used in a manure management program to absorb and collect the atmospheric moisture and dissolved odorous substances, some of which can be recycled, that present social and health concerns. This device can be similarly used in other industrial and commercial situations.

This invention has military application for use in refugee care, water supply, and human waste pollution control, humidity control in tents, and aid to air conditioning in medical facilities and field hospitals.

This invention has application for military personnel, in field conditions, for use in supplemental water supply for equipment care and maintenance, and human needs, and latrine operation and pollution control.

SUMMARY OF THE INVENTION

A device for absorbing atmospheric moisture includes a support member with a net extending therefrom. The net includes a super absorbent polymer that has the property of being able to absorb a multiple of the polymer mass in atmospheric water and to thereafter release the water in response to an external stimulus. The device is in this way reusable. The device has particular application in the clearing of fog, manure odor clearance, and collection of potable water in remote locations.

A process for extracting atmospheric moisture is also detailed that includes the step of extending a super absorbent polymer net into contact with an atmosphere. Thereafter, with that being in contact with the atmosphere for a sufficient amount of time moisture is absorbed from the atmosphere. The application of a stimulus to the super absorbent polymer containing atmospheric moisture causes the release of liquid water therefrom. The super absorbent polymer is then suitable for reuse to again absorb atmospheric water.

BRIEF DESCRIPTION OF THE INVENTION

A better understanding of the present invention will be had upon reference to the following detailed description when read in conjunction with the accompanying drawing, wherein like reference characters refer to like parts throughout the several views, and in which.

DETAILED DESCRIPTION OF THE PREFERRED EMBODIMENTS

The present invention has utility in absorbing atmospheric moisture with a super absorbent polymer having the property of being able to absorb a multiple of the super absorbent polymer mass of atmospheric water and to release this water in response to external stimuli. A water swellable super absorbent polymer as described herein is a synthetic or natural polymer. Super absorbent polymers and optional matrices therefor are detailed in U.S. Pat. No. 6,051,317 which is incorporated herein by reference.

Grain sizes for super absorbent polymer particles range from 0.1 micron to 20,000 microns. Preferably, super absorbent particles are used in the range from 1 micron to 5,000 microns, and more preferably, from 50 to 1,000 microns.

This invention employs super absorbent polymer placed in nets or sheets hung to passively absorb atmospheric moisture. This collected water may then be retrieved from the polymer. The retrieved water may be discarded or used depending on the application. Various specific embodiments are described in detail: room dehumidifier, fog dispersal, water retrieval, and a manure management tool, and military applications; however, these specific embodiments in no way are meant to limit the scope of the invention.

Figure 1:
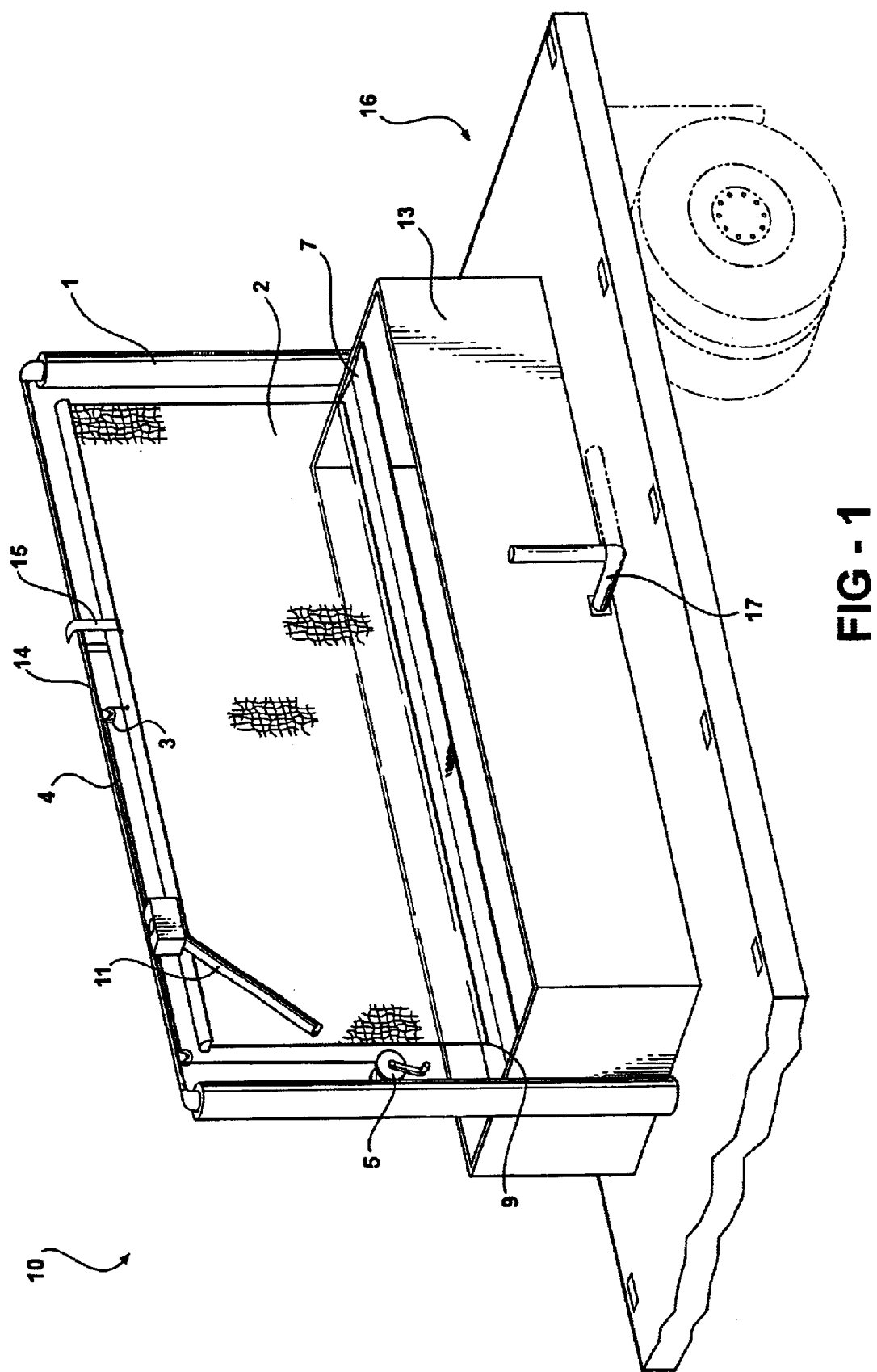
FIG. 1 illustrates an atmospheric absorbing device according to the present invention.

Referring now to FIG. 1, a device 10 is detailed having at least one mounting post 1 braced to support a super absorbent polymer net 2. Typically two vertical posts are used and a net 2 suspended therebetween on suspension cable 14 by snap hooks 15 and net pulley 3, after being raised into position by means of pulley rope 4.

The posts 1 are typically 4 to 20 feet in height and spaced according to the load strength of the net 2 when fully loaded with atmospheric water. The net 2 is preferably in the form of a cargo net structure with ropes of hollow tubes of water-permeable cloth filled in isolated sections with super absorbent polymer beads and or gel therein. The tubes are mounted vertically within a frame of conventional rope. Preferably, the isolated sections are between 3 and 24 inches in length, more preferably the tubes are spaced from 1 inch to 12 inches apart, typical area being defined by a conventional rope frame is anywhere from 1 to 200 square feet. It is appreciated that such a frame can be scaled to nearly any size based upon mechanical weight bearing properties of construction components and expected atmospheric moisture content and environmental conditions.

The base trough 13 is located below the net 2 to collect loaded water within the net 2 after it is released therefrom by application of an external stimulus by stimuli applicator 11. The base trough 13 has a swivel drain pipe 17 to facilitate removal of the water.

Preferably, the frame is selectively extended from post 1 to collect atmospheric moisture through the use of the pulley wheel 3 attached to a cable 4 and the crank 5. It is appreciated that a selectively deployable super absorbent polymer net will have a greater serviceable lifetime if stored when not in use. In order to afford greater rigidity, preferably a frame 7 is affixed to a base trough 13 to support the net 2 in an undeployed position. More preferably, the base trough 13 is mechanically coupled to the selective frame extension system including the pulley wheel 3, cable 4 and the crank 5. It is appreciated that a selective frame extension according to the present invention is in the form of any conventional system illustratively including an electric winch, a telescoping post, a cantilevered rail and extendible wheel for bridge use, retractable tethered helium balloons for park authority establishing remote wildlife drinking ponds. Still more preferably, a second bottom slat 9 is attached to the bottom frame during extension.

A liquid trough 13 is located below the net 2 when in an extended position. The trough 13 extends the length of the frame 7 to collect water within the net 2 after it is released therefrom by application of an external stimulus. Preferably, the liquid trough has a swivel drain pipe 17 in order to facilitate removal of released water from the net 2 that has collected in the trough 13.

The moisture absorbent device as detailed herein has application in a fog dispelling embodiment. For a highway fog pocket situation, an inventive device as detailed herein is mounted on a flatbed truck base 16, suspended from guardrail posts or devoted use posts in locations where fog is known to regularly occur. It is appreciated that the inventive device is readily coupled to wireless communication technology to remotely activate the inventive device. Remote activation requires the addition of an antenna receiver and conventional automated operation components relating to extension and recycle (not shown). Power to operate a remotely activated device is supplied from line voltage, solar, wind, or other available power sources. In operation an inventive device is assembled at a selected location. The super absorbent polymer net upon exposure to moisture in a fogged area becomes engorged with the atmospheric moisture thereby increasing significantly in weight. The increased weight associated with the engorged net triggers a stimulus applicator thereby inducing release of water from the net. Preferably, the stimulus applicator is then reset and the cycle of water loading and discharge repeat automatically. It is appreciated that the device materials other than the super absorbent polymer are constructed of a variety of materials illustratively including wood, metal, and plastic consistent with water quality, cost, and local material availability conditions.

In another application, the inventive device is used at airports and other large area situations. Through the strategic placement of inventive devices as described above, the atmosphere in the vicinity of the inventive device becomes too dry to support fog formation. As a result, a comparatively dry pocket of air is formed. A dry pocket extends into a fogged area and absorbs additional atmospheric moisture thereby diluting the fog. As the engorgement and release of liquid water continues from the inventive device, dilution of the fog in adjacent areas continues thereby decreasing fog thickness and enhancing ground visibility. The rate of fog thinning with the inventive device depends on several factors illustratively including the size of the device, the placement and number of inventive devices deployed, terrain, topography, temperature, wind speed and direction, and humidity.

Figure 2:
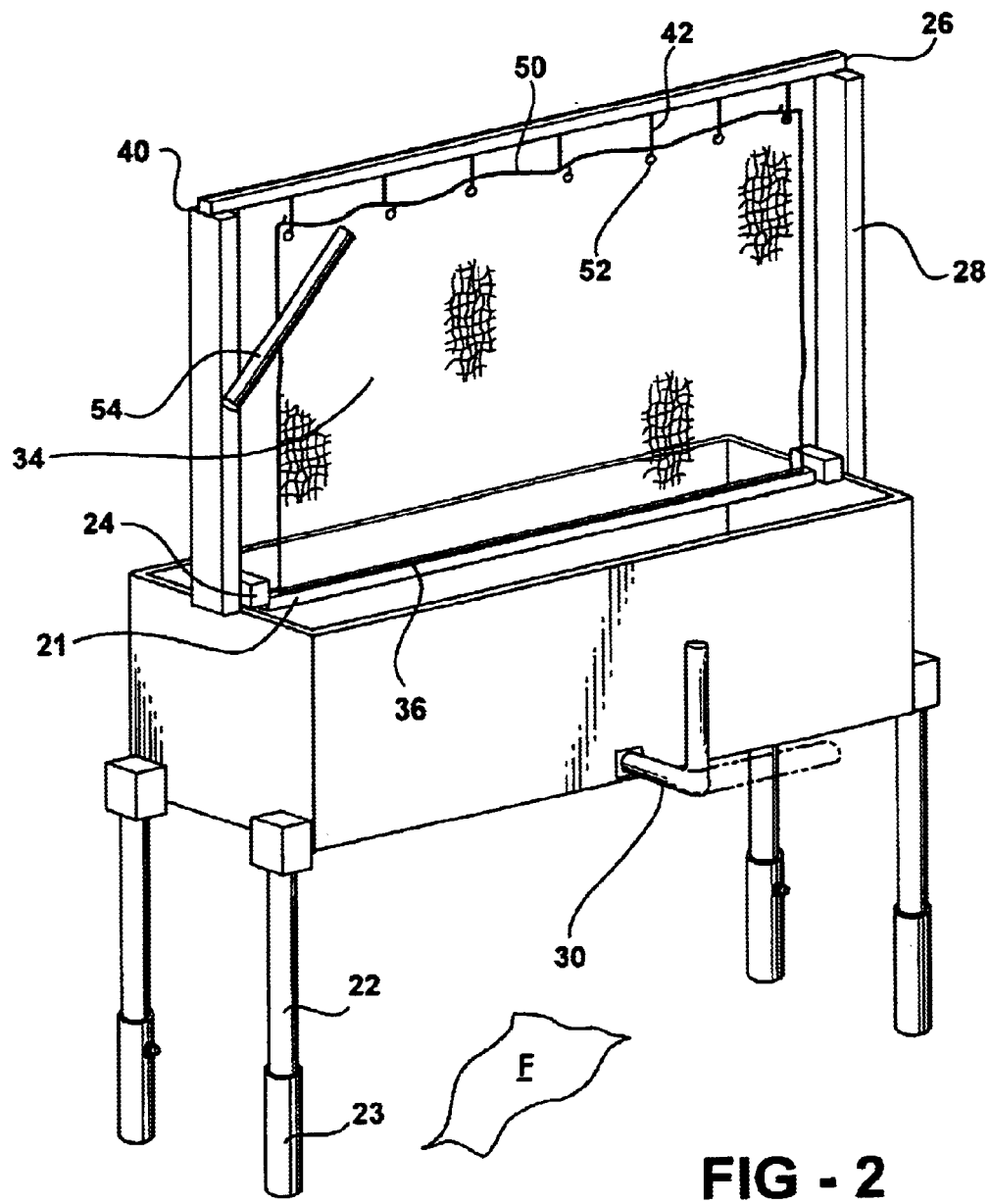
FIG. 2 illustrates an atmospheric absorbing device embodiment suited for use as a room dehumidifier.

In another embodiment, the inventive device is operative as a room dehumidifier. Referring now to FIG. 2 a trough-shaped base 21 is supported above a floor F on legs 22 with optional height adjusters 23. Inside the base 21 is a support block 24 for the ends of a curtain winding rod 26. The support block 24 also secures two curtain support rods 28. Preferably, the base 21 has a slight angle, and a swivel drain tube 30 is attached thereto. The base 21 is typically constructed of materials illustratively including wood, metal, and plastic. The curtain 34 has a bottom edge 36 that is attached to the curtain winding rod 26. The bottom end of the curtain rod 34 fits into block 24 inside the base 21. The curtain support rods 28 encompass the curtain 34. The curtain rod 26 is secured to support rods 28 by angle post lock brackets 40. Preferably the curtain rod 26 has a hook 42 adapted to engage the curtain 34. The curtain 34 in a typical configuration includes one inch diameter hollow tubes of water permeable cloth fitted in isolated sections with super absorbent polymer beads or gel. Tubes are spaced vertically. More preferably, the tubes are affixed to a continuous sheet of water permeable cloth.

Additional reinforcement members (not shown) are provided based upon the polymer water absorbing capability and structural properties of device components elements. Preferably, the top edge 50 of the curtain 34 includes at least one loop 52 adapted to engage the hook 42 of the rod 26.

A stimulus applicator 54 is affixed to the rod 26 and activated by the curtain attaining a preselected water weight. The stimulus applicator 54 is appreciated to operate and reset either automatically or manually.

In still another application, a super absorbent polymer net as described herein is suspended in a louvered structure, attached or built as part of a structure to provide a mist spring of potable water. In this application, a housing is provided to protect the super absorbent polymer net associated apparatus from wildlife contamination. In such an application, a released water collection base has an inner lining of plastic or stainless steel to facilitate cleaning and maintenance of sanitary conditions. It is appreciated that device materials other than the super absorbent polymer are constructed of materials illustratively including wood, metal, and plastic consistent with water quality, cost, and local material available conditions. An automatic stimulus applicator provided with the inventive device is preferably utilized to deliver released water at user specified intervals under a variety of humidity conditions. It is appreciated that the instant device is readily operated absent external line power and is well suited for rural and remote environment uses.

Figure 3:
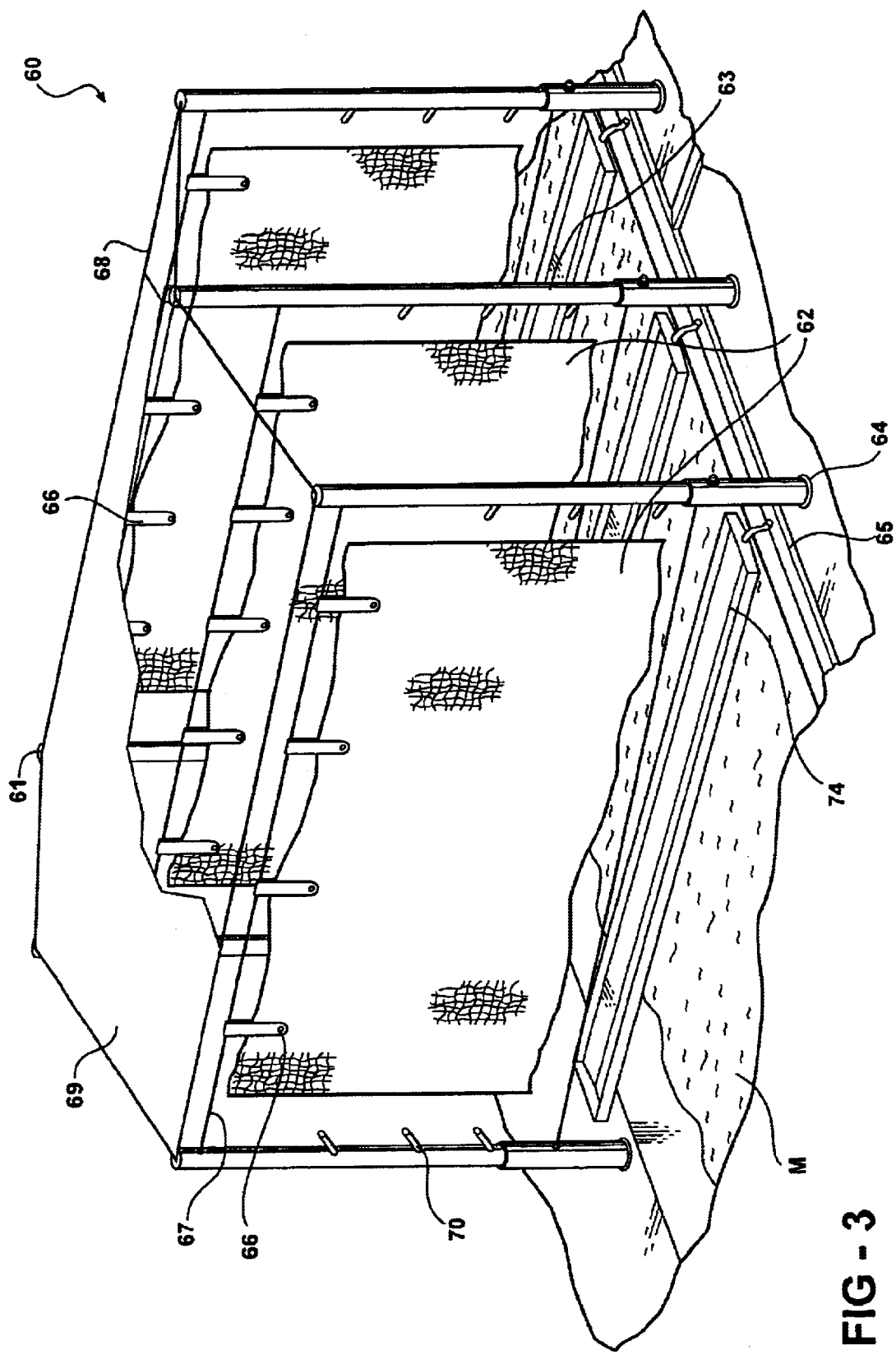
FIG. 3 illustrates an atmospheric absorbing device embodiment suited for use as a pollution control tool in a manure management program.

FIG. 3 illustrates an atmospheric moisture absorbing device embodiment well suited for use as an odor reducing and urea recovery manure management tool.

Referring now to FIG. 3, a device shown generally at 60 is detailed having at least one mounting post 61 braced to support a super absorbent polymer net 62. Typically two vertical posts 61 on each side on the manure lagoon M and two nets, net 62 supported therebetween across the manure lagoon M.

A cover support post 63 is located on each side of the manure lagoon M to support and anchor the cover 69.

Three metal post holes 64 are located on each side of the manure lagoon M to locate and engage the mounting posts 61 and the cover support posts 63.

A liquid trough 74 is located below each net 62 and is angled slightly to drain into liquid manifold 65.

Liquid manifold 65 is located at the lower end of liquid troughs 74 and collects and directs the liquid beyond the edge of the manure lagoon M for disposal.

Support cable 67 supports net 62 through support straps 66 and liquid trough 74 and liquid manifold 65.

Cover cable 68 supports and anchors plastic cover 69.

Stimuli applicator 70 is mounted on mounting posts 61 for each net 62.

On each side of the manure lagoon M located 2 feet from the side, 3 metal post holes are inserted typically 4 feet into the ground at points typically 8 feet, 14 feet, and 22 feet from the end of the lagoon M. Two mounting posts 61 and one cover support post 63 are installed in the metal post holes 8 feet, 14 feet, and 22 feet, respectively, on each side of the manure lagoon M.

Support cable 67 extends horizontally across the manure lagoon M from about one foot below the top of each mounting post 61. Super absorbent polymer net 62 and liquid trough 74 and liquid manifold 65 are suspended from support cable 67. Mounting post 61 typically is about 14 feet in length, cover support post 63 typically is about 12 feet in length, and metal post hole 64 typically is about 4 feet in length. Plastic cover 69 is supported and anchored by cover cable 68.

This device has application in manure management programs of large dairy, beef, pork, and poultry operations.

The stimulus applied herein to release water from an engorged super absorbent polymer illustratively includes pH change or protonation/deprotonation as detailed in Department of Energy, Office of Science—Feature Article May 7, 2001 Polymer Improvements, which is incorporated herein by reference.

While the forms of the invention herein described constitute presently preferred embodiments, many others are possible. It is not intended herein to mention all the possible equivalent forms or ramifications of the invention. It is understood that the terms used herein are merely descriptive rather than limiting and various changes may be made without departing from the spirit or scope of the invention. Such changes will be apparent to one skilled in the art.

We claim:

1. A process for extracting atmospheric moisture comprising the steps of:

extending a net comprising a super absorbent polymer in contact with an atmosphere;

allowing sufficient time for said net to absorb moisture from the atmosphere; and applying a stimulus to said super absorbent polymer to cause release of wafer therefrom.

2. The process of claim 1 wherein said stimulus is a pH changing solution.

3. The process of claim 1 wherein atmospheric moisture is absorbed proximal to a situs selected from the group consisting of an airport, a road, a dwelling interior and a manure pit.

4. An atmospheric moisture absorbing device comprising:

a support member;

a net comprising super absorbent polymer, said net extending from said support; and a stimulus applicator dispersing a water releasing stimulant into contact with said super absorbent polymer.

5. The device of claim 4 further comprising a net extending system coupled to said net and said support.

6. The device of claim 5 wherein said net extending system comprises a pulley wheel, a cable and a crank.

7. The device of claim 4 wherein said support comprises at least one vertical post.

8. The device of claim 7 wherein said at least one vertical post comprises a pair of vertical posts having said net suspended therebetween.

9. The device of claim 8 further comprising a cover over said net.

10. The device of claim 4 further comprising a liquid trough beneath said net and adapted to collect water released from said net.

11. The device of claim 10 wherein said liquid trough further comprises a drain.

* * * * *

UNITED STATES PATENT AND TRADEMARK OFFICE
CERTIFICATE OF CORRECTION

PATENT NO. : 6,869,464 B2
DATED : March 22, 2005
INVENTOR(S) : John Klemic

It is certified that error appears in the above-identified patent and that said Letters Patent is hereby corrected as shown below:

Column 2,
Line 11, "BRIEF DESCRIPTION OF THE INVENTION" should be replaced with
-- BRIEF DESCRIPTION OF THE DRAWINGS --.

Column 4,
Line 12, "Figure 2" should be replaced with -- Figure 2, --.

Signed and Sealed this

Twelfth Day of July, 2005

JON W. DUDAS
*Director of the United States Patent and Trademark Office*